United States Patent [19]

Swan et al.

[11] Patent Number: 5,657,151
[45] Date of Patent: Aug. 12, 1997

[54] POLARIZATION SCRAMBLER/MODULATOR

[75] Inventors: Clarence B. Swan, Lower Macungie, Pa.; Neal H. Thorsten, Lebanon, N.J.

[73] Assignee: Lucent Technologies Inc., Murray Hill, N.J.

[21] Appl. No.: 164,505

[22] Filed: Dec. 9, 1993

[51] Int. Cl.[6] ................................................. G02F 1/09
[52] U.S. Cl. ..................... 359/281; 359/156; 359/181
[58] Field of Search ............................... 359/280, 281, 359/282, 283, 154, 156, 181, 192; 385/33, 34, 119; 372/101

[56] References Cited

U.S. PATENT DOCUMENTS

| | | | |
|---|---|---|---|
| 4,222,668 | 9/1980 | Henry | 356/350 |
| 4,806,885 | 2/1989 | Morimoto | 332/7.51 |
| 4,909,612 | 3/1990 | Scerbak et al. | 350/375 |
| 4,947,107 | 8/1990 | Doerfler et al. | 324/96 |
| 4,988,170 | 1/1991 | Buhrer | 350/377 |
| 4,991,938 | 2/1991 | Buhrer et al. | 350/403 |
| 5,033,830 | 7/1991 | Jameson | 350/403 |
| 5,042,039 | 8/1991 | Edagawa et al. | 372/6 |
| 5,052,786 | 10/1991 | Schulz | 359/484 |
| 5,113,404 | 5/1992 | Gaebe et al. | 372/36 |
| 5,115,340 | 5/1992 | Tidwell | 359/484 |
| 5,245,689 | 9/1993 | Gualtieri | 385/142 |
| 5,305,137 | 4/1994 | Okhawara | 359/281 |
| 5,309,535 | 5/1994 | Bergano et al. | 385/38 |
| 5,315,431 | 5/1994 | Masuda et al. | 359/281 |
| 5,361,270 | 11/1994 | Heismann | 372/27 |

FOREIGN PATENT DOCUMENTS

| | | |
|---|---|---|
| 307545 | 3/1929 | United Kingdom . |
| 1060778 | 3/1967 | United Kingdom . |
| 1179622 | 1/1970 | United Kingdom . |

*Primary Examiner*—Georgia Y. Epps
*Assistant Examiner*—Dawn-Marie Bey

[57] ABSTRACT

A modulator and scrambler for utilization in lightwave transmission systems which utilizes an electrically controlled Faraday rotator to modulate the polarization of an optical signal. The modulator rotates the polarization of light by a controlled or time-varying amount due to the application of a variable magnetic field to a Faraday rotator material via an external electric coil. To permit high frequency excitation of the Faraday rotator a non-conducting, non-magnetic material such as glass or a composite is used for the casing of the Faraday rotator. A Faraday rotator material requiring a low intensity magnetic field, such as the Bismuth Iron Garnet films, is preferred. Several films may be stacked to increase the rotation range for a given amplitude of induced magnetic field. The modulator may include one or more optical reflectors to achieve multiple passes through the Faraday rotator to multiply the total rotation with modest additional insertion loss. The modulator modulates or scrambles the polarization of the optical signal in fiber amplifier applications to avoid the cumulative depreciation in signal to noise in long-range systems with many cascaded amplifiers (e.g., undersea) where the fixed polarization signal experiences lower gain than does the unpolarized noise in the system. The modulation frequency required to achieve these results in Erbium Doped Fiber Amplifiers may be in the tens of Kilohertz range which is well within the frequency response capability of garnet materials.

16 Claims, 3 Drawing Sheets

100

400

500

POLARIZATION SCRAMBLER/MODULATOR

BACKGROUND OF THE INVENTION

1. Field of the Invention

The present invention relates generally to Faraday rotators, and, more particularly, to the utilization of electrically controlled Faraday rotators in lightwave transmission systems to modulate the polarization of optical signals.

2. Related Art

In many lightwave communication systems them is an increasing desire to provide direct optical amplification, in contrast to prior arrangements which utilized opto-electronic converters and electronic regenerators/repeaters to boost signal power. Some applications include undersea voice and data communication systems, and terrestrial broadband distribution systems.

The attraction to replacing the optoelectronic regenerators in long-range transmission systems with optical amplifiers is the potential of creating a "lightpipe" which is transparent to the bit rate and transmission format. In addition, the use of optical amplifiers enables a transmission system to convey wavelength-division multiplexed signals without the need for multiple repeaters. This elimination of repeaters is significant since the cost of long distance lightwave communication systems is closely related to the distance spanned by the optical fiber transmission medium between repeaters. As this distance increases, the relative cost of a system generally decreases with respect to cost of installation and maintenance.

Long distance lightwave communication systems employ amplifiers periodically along the fiber cable. Each discrete amplifier boosts the optical signal power supplied to the next span of fiber in much the same manner as conventional electronic amplifiers for analog coaxial-cable systems. See Optical Fiber Telecommunications II (S. E. Miller et al., eds., Academic Press 1988). Optical isolators are generally employed with each amplifier to avoid feedback effects.

There is a considerable effort under way to develop rare earth doped fiber amplifiers for use in these systems. Rare earth doped optical amplifying fibers are know to have low cost, low noise properties, a relatively large bandwidth, and minimal crosstalk. In use, rare earth doped optical fiber amplifiers are usually coupled end-to-end with an optical communication fiber and are further coupled (via a wave division multiplexer) to a laser diode pump signal source. The presence of the pump signal (at a particular wavelength, for example, 980 nm or 1480 nm) with the communication signal within the rare earth doped fiber results in optical gain of the communication signal. There exists many arrangements in undersea and terrestrial lightwave transmission systems for providing doped fiber amplification. One such arrangement is disclosed in U.S. Pat. No. 5,042,039 to Edagawa et al. As described therein, an erbium-doped optical fiber is utilized to provide gain to a communication signal by simultaneously passing a "pumping" signal (at an appropriate wavelength) through the erbium-doped medium.

However, there are difficulties associated with transmitting data over long optical fiber spans with cascaded discrete amplifier stages, including chromatic dispersion, polarization dispersion, transmission fiber nonlinearities, optical amplifier nonlinearities, and the accumulation of noise. The evolution of the signal and noise in concatenated optical amplifiers has been discussed in T. Mukai et al., *S/N and Error Rate Performance in AlGaAs Semiconductor Laser Preamplifier and Linear Repeater Systems*, Quantum Electron QE-18(No. 10):1560–1568 (1982). In practice, amplifier saturation must be considered in view of the competition between the amplified spontaneous emission (ASE) and the optical signal in view of the power available from the optical amplifiers. With concatenated optical amplifiers, this problem becomes especially severe as the ASE, which is characterized as white noise, builds up in successive amplifiers to cause a noise power that becomes progressively higher relative to the single power. In a transmission system this problem is exaggerated by an effect referred to as "hole-burning" where the cumulative gain of the noise, which is at all polarizations, can be higher than that of the signal, which is generally highly polarized. That is, there is a relative depletion of the excited states at the polarization of the optical signal, resulting in a slightly reduced gain in each amplifier for the signal relative to the noise. For example, a typical amplifier in a long-range system has a gain of approximately 10–12 dB. In such a system, if the noise experiences a gain of 10 dB and the signal experiences a gain of 9.90 dB (slight hole-burning), this results in a signal which experiences 10 dB less gain over a system with 100 amplifiers. This has a severe impact on system performance.

What is needed, therefore, is a means for the signal to uniformly utilize all of the polarization states of the fiber amplifier to avoid this cumulative polarization-dependent gain effect in long range lightwave transmission systems having cascaded amplifiers.

SUMMARY OF THE INVENTION

The concerns mentioned above are addressed by the present invention which relates to modulators and scramblers for utilization in lightwave transmission systems and, more particularly, to the utilization of electrically controlled Faraday rotators in lightwave transmission systems to modulate the polarization of optical signals.

In accordance with an exemplary embodiment of the present invention, a modulator is disclosed which utilizes a Faraday rotator. The Faraday rotator rotates the polarization of light by a controlled amount by the application of a variable magnetic field to a Faraday rotator material. A Faraday rotator similar in construction to those used in optical isolators is employed. However, the permanent magnet which is typically used in the Faraday rotator is replaced by an external electric coil. To permit high frequency excitation of the Faraday rotator, the body of the isolator is replaced with a non-conducting, non-magnetic material such as glass or a composite. In addition, a Faraday rotator material requiring a low magnetic field, such as a Bismuth Iron Garnet film, is used. Several films may be stacked to increase the rotation range for a given amplitude of induced magnetic field.

Alternative embodiments include configurations wherein multiple passes through the Faraday rotator are achieved to multiply the total rotation with modest additional insertion loss. Such embodiments may include the use of reflectors and appropriate positioning of the input and output fibers.

One application of the present invention where the Faraday rotator is used to modulate or scramble the polarization of an optical signal is in fiber amplifier applications. The polarization modulation enables the optical signal to avoid the cumulative polarization dependent gain effects in long communications systems with many cascaded amplifiers (undersea). The modulation frequency required to achieve these results in Erbium Doped Fiber Amplifiers may be in the tens of Kilohertz range which is well within the frequency response capability of garnet materials.

Further features and advantages of the present invention as well as the structure and operation of various embodiments of the present invention are described in detail below with reference to the accompanying drawings. In the drawings, like reference numbers indicate identical or functionally similar elements. Additionally, the left-most digit of a reference number identifies the drawing in which the reference number first appears.

DETAILED DESCRIPTION OF THE PREFERRED EMBODIMENTS

I. System Environment

Figure 1:
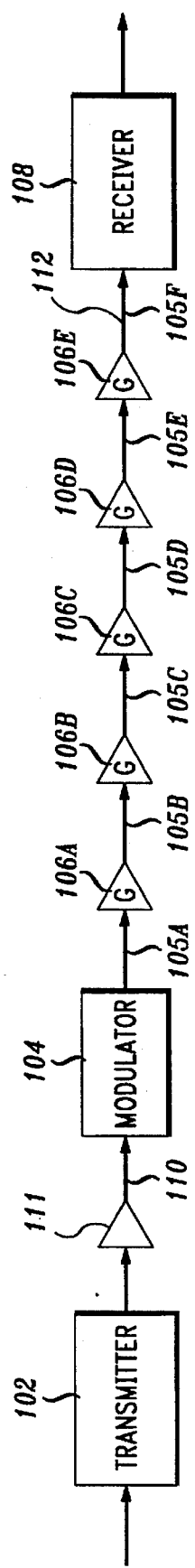
FIG. 1 shows a simplified block diagram of a multiple span, long distance, lightwave communication system employing distributed amplification wherein the preferred embodiment of the modulator of the present invention is implemented.

FIG. 1 is a simplified block diagram of a long range lightwave communications system. Referring to FIG. 1, exemplary lightwave communication system 100 has six spans of low-loss optical fiber 105A–105F (collectively and generally referred to as 105). A transmitter 102 is shown optically coupled to first link 105A by transmission medium 110 through a modulator 104 of the present invention. Optical fiber spans 105 substantially cover the long distance between transmitter 102 and receiver 108. Transmission medium 110 is an optical fiber in the preferred embodiment. However, transmission medium 110 may be any other suitable waveguide device for lightwave transmissions. In a similar manner, a receiver 108 is shown optically coupled to the sixth link 105F by transmission medium 112. Transmission medium 112 is also an optical fiber in the preferred embodiment, but may be some other suitable waveguide device for lightwave transmissions.

Figure 6:
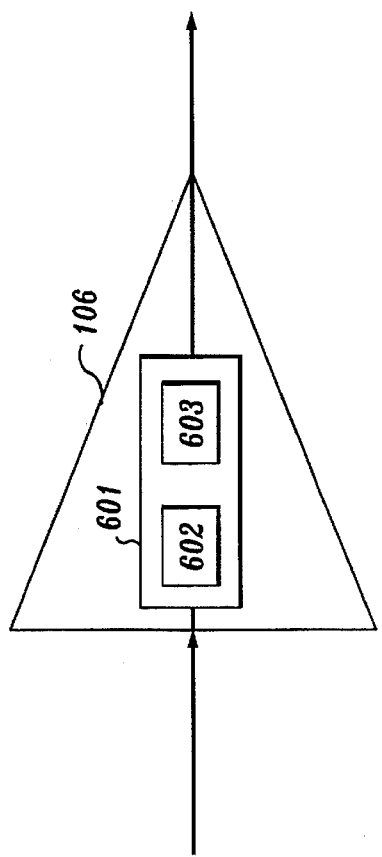
FIG. 6 is a simplified block diagram of the repeater of FIG. 1.

Each span 105 is coupled to the neighboring span 105 though a repeater. In communications system 100, there are five repeaters 106A–106E (collectively and generally referred to as 106). Each repeater includes a span of erbium-doped optical fiber, typically in the range of 10 meters. Repeaters 106 also include one or more pump lasers which are optically coupled through a wavelength division multiplexer for the pumping of the transmitted lightwave signal. Each repeater 106 also includes one or more single or multi-staged optical amplifier, isolators, and other components which are common to such long-range lightwave communications systems. For example, a block diagram of the repeater 106 is shown in FIG. 6 where an amplifier 601 includes a pump laser 602 and a wavelength division multiplexer 603. As would be considered apparent to one skilled in the relevant art, lightwave communications system 100 is a generic system meant to exemplify any type of long range lightwave communication system. The transmission medium 110 can be an optical fiber that includes an amplifier 111 similar to the amplifier 601.

The gain applied by the multiple cascaded amplifiers along each of the optical fiber spans results in cumulative gain of noise as well as signal power. However, since the noise is at all polarizations and the optical signal is typically at a single polarization, the cumulative gain of the noise can be higher than that of the optical signal due to the relative depletion of the excited states at the polarization of the signal.

When the polarization of the optical signal is modulated slowly or not at all, the gain of the amplifier continues to be polarization-dependent. Irrespective of the momentary polarization of the optical signal, the noise always sees a higher gain. The inventors have discovered that, to prevent the gain suppression or, more accurately, gain depression, from occurring, the optical signal has to see the same gain as the noise. The inventors found that this can be achieved by rapidly varying the polarization of the optical signal.

By employing electrically controlled Faraday rotators, the modulator 104 of the present invention enables lightwave transmission system 100 to uniformly utilize all of the polarization states of the optical signal to avoid this cumulative polarization-dependent gain effect resulting from the cascaded amplifiers. The preferred and alternative embodiments of modulator 104 are described below.

The present invention provides a polarization-independent gain of the optical signal in the long optical fiber span using multiple cascaded amplifiers. While such long spans are described in the context of the exemplary embodiments below, it should be understood by those skilled in the relevant art that the present invention may be used to achieve polarization-independent gain of the optical signal in any length span with any number of amplifiers.

II. Faraday Rotators

A typical Faraday rotator is constructed by placing a magneto-optical material within a magnetic field. The magnetic field causes the polarization of light passing through the material to rotate. The amount of rotation is a function of the type of material, the wavelength of the light, the magnetic field strength, and the ambient temperature of the material.

Figure 2:
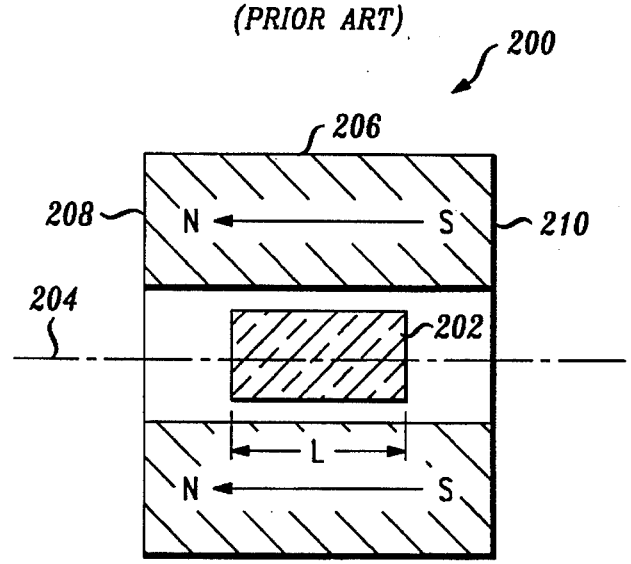
FIG. 2 is an axial cross-sectional view of a conventional Faraday rotator.

FIG. 2 is a cross-sectional view of a commonly used Faraday rotator 200 which is well known in the art. Faraday rotator 200 includes a Faraday medium 202 extending along an axis 204 and an axially symmetric magnet 206. The Faraday medium 202 can be any of a number of transmissive materials which exhibit a Faraday effect. Since Faraday media are effective for different wavelength intervals, it is necessary to choose an appropriate material depending upon the intended wavelength of the optical signal. Examples of Faraday media include terbium gallium garnet (TGG), zinc selenide (ZnSe), terbium doped glasses, cadmium manganese telluride (CdMnTe) and indium antimonide (InSb).

Polarized light energy which is received by Faraday rotator 200 at a first side 208 from a direction along the optical axis 204 is transmitted through Faraday medium 202 to an opposite second side 210 of Faraday rotator 200. The angle of rotation of the polarization plane of the transmitted optical signal is proportional to the axial length L of Faraday medium 202 and the strength of the magnetic field imposed upon Faraday medium 202 by magnet 206.

Faraday rotators have the property of rotating the polarization vector of light passing through it in the same sense or chirality (clock-wise or counter-clock-wise) regardless of the direction in which the light passes through the Faraday rotator. For example, if a Faraday rotator were constructed to rotate the polarization vector of a light passing through it in a clock-wise direction by 45°, passing that same light back through the Faraday rotator in the opposite direction would not cause the polarization vector of the light to be rotated counter-clockwise by 45° back to its original orientation. Instead, the light polarization vector would be rotated an additional 45° in the clock-wise direction, resulting in an output optical signal whose polarization vector would then be perpendicular (90°) to its original orientation. This characteristic of Faraday rotators is referred to as non-reciprocity. Faraday rotators are commonly used as a key component in optical isolators to provide rotation of optical signal polarization to achieve a desired isolation.

In conventional Faraday rotators, it is desirable to ensure saturation of the Faraday rotation to fix the rotation at a particular value, typically at 45°. The magnetic field which is applied to the Faraday rotator medium under such conditions is referred to as the saturation field, and is a function of the type of Faraday rotator material used. When the Faraday rotator is magnetized above the saturation level, the rotation is pinned at a particular values and is no longer magnetic field dependent. However, it is still wavelength and temperature dependent.

III. Single Pass Modulator

Figure 3:
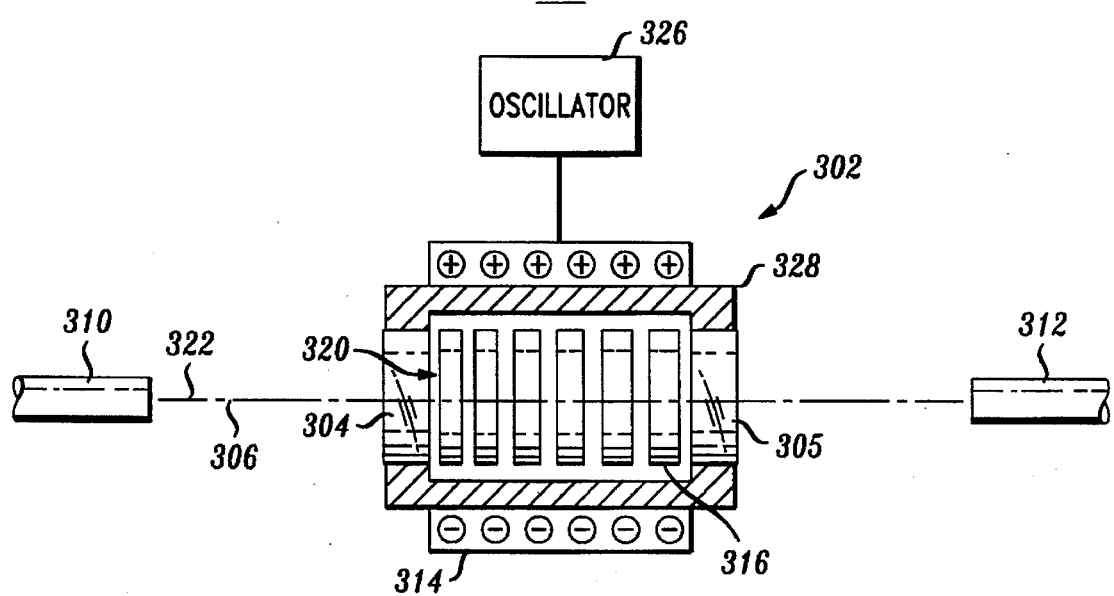
FIG. 3 is a modulator system utilizing the preferred embodiment of the Faraday rotator of the present invention.

FIG. 3 illustrates a modulator 300 of the present invention, which inches a Faraday rotator 302 incorporating the features of the present invention. Referring now to FIG. 3, an optical signal 322 exits an input optical fiber 310 and enters a lens 304. In the environment in which the preferred embodiment of the present invention operates, the wavelength of optical signal 322 is in the range of 1525–1565 nm. However, as will be discussed below, the modulator of the present invention may be implemented with any wavelength optical signal (for example, 1480 nm). Input optical fiber 310 and output optical fiber 312 are known to have low cost, low noise properties, a relatively large bandwidth, minimal crosstalk problems, and relatively low insertion losses at the wavelengths which are used in these systems (for example, 1550 nm). Input optical fiber 310 may provide light which is at a constant polarization. For example, input fiber 310 may be a polarization maintaining fiber or the source of light may be a laser which generates light at a single frequency. Output optical fiber 312, however, may not be polarization dependent since the polarization rotation of the optical signal is time-varying when it leaves Faraday rotator 302.

When optical beam 322 leaves input fiber 310, it disperses due to known characteristics of optical fibers. This dispersed signal is then received by lens 304. Lens 304 focuses the divergent rays contained within optical signal 322 to produce a collimated optical beam wherein the light rays are substantially parallel with each other. In the preferred embodiment of the present invention, lens 304 is a graded index lens. However, as one skilled in the relevant art will recognize, lens 304 may be any means which achieves collimation of the dispersed light emitted from input fiber 310. For example, lens 304 may be a spherical or aspherical lens.

The collimated optical signal 322 is then passed through the Faraday rotator 302 of the present invention. The rotation experienced by optical signal 322 as it passes through Faraday rotator 302 is described in detail below. Upon exiting Faraday rotator 302, the optical beam 322 travels along optical axis 306 and is imaged onto an output optical fiber 312 through lens 305. Lens 305 performs the same function as lens 304 and may be made of the same material. As noted above, output optical fiber 312 may be of the same configuration and material composition as input optical fiber 310.

Faraday rotator 302 contains Faraday rotator medium 320. Faraday rotator medium is typically made of the materials described with reference to FIG. 2. However, in the preferred embodiment, a Faraday rotator medium 320 which requires a relatively lower magnetic field to achieve a given rotation is used. A Faraday rotator requiring a low magnetic field provides a high frequency modulation with achievable AC drive currents in the coil.

In addition, since Faraday media are effective for different wavelength intervals, it is necessary to choose an appropriate material depending upon the intended wavelength of the optical energy. In the preferred embodiment, the Faraday rotator medium is selected to be effective for wavelengths in the range of 1525–1565 nm. To achieve high frequency modulation of optical signals operating in the wavelength range, Faraday rotator medium 320 is composed of at least one thin film layer of Bismuth Iron Garnet (BIG), available from AT&T, Murray Hill, N.J., U.S.A. However, any type of transmissive material which exhibits the desired Faraday effect at the desired wavelengths under a low magnetic field may be used. For example, Faraday rotator medium 320 may be yttrium-iron garnet ($Y_3Fe$).

The greater the length of the optical transmission path through Faraday rotator medium 320, the greater the angular rotation which is applied to the collimated optical signal 322 under a given magnetic field. However, garnet film elements are typically limited in thickness due to their manufacturing process. Thus, in the preferred embodiment of the present invention, Faraday rotator 302 has a number of garnet film elements 316 serially stacked to increase the rotation range for a given amplitude of induced magnetic field. The Faraday medium 320 illustrated in FIG. 3 has a stack of five garnet film elements 316 separated by air in casing 326. Alternative configurations would be apparent to those skilled in the relevant art. For example, the garnet film elements may be sandwiched together using suitable dielectric material or optically transparent adhesive. Thus, one may achieve a Faraday rotator medium which is of any length for a given application. As noted above, the longer the optically active material, the greater the polarization rotation which is achieved for a given magnetic field. However, greater optical losses are experienced as the length of the Faraday rotator medium is increased.

In the Faraday rotator 302 of the present invention, a magnetic coil 314 is used to create the magnetic field rather than the fixed magnets used on conventional Faraday rotators. The magnetic field produced by coil 314 is substantially parallel to optical axis 306 within Faraday rotator medium 320. This applied magnetic field is used in the present invention to obtain the desired degree of rotation of the polarization of optical signal 322 as it propagates along optical axis 306 within Faraday rotator 302.

Coil 314 is a low inductance, high current coil. These characteristics enable coil 314 to achieve a high magnetic field at high frequencies without requiring a high AC drive voltage. Referring to FIG. 3, coil 314 is wound around Faraday rotator medium 320 of the garnet film elements 316. In the example illustrated in FIG. 3, there are six windings of coil 314. However, it would be apparent to one skilled in the relevant art to use any number of windings necessary to induce the desired magnetic field in garnet film elements. Some factors upon which the number of coil windings chosen will depend upon are the type of Faraday rotator medium, the size and efficiency of the power supply 326, the desired polarization rotation, and the overall limitations on the size of modulator 300.

Coil 314 is excited by an oscillator 326 which produces a time-varying driving current. The high frequency at which coil 314 is driven induces an oscillating magnetic field within the Faraday rotator medium 316. By using a time-varying power source to induce the magnetic field, the polarization of the optical signal 322 is modulated according to the induced frequency. This high frequency polarization modulation effectively reduces the "hole-burning" phenomenon in the fiber amplifier optical transmission systems. In the preferred embodiment of the present invention, oscillator 326 produces a sinusoidal driving current. However, it would be apparent to one skilled in the relevant art to have oscillator 326 produce driving currents with other configurations. For example, oscillator 326 may be configured to produce a driving current which is triangular in shape to result in a rotation which changes linearly with time.

In the Faraday rotator of the present invention, the magnetic field which is applied is below the saturation level. This is because when the Faraday rotator is magnetized above the saturation level, the rotation is maintained at a particular value and is no longer dependent upon the applied magnetic field. Thus, maintaining the magnetic field at a value which is less than the saturation field ensures that the polarization rotation is always dependent upon the applied magnetic field. In the preferred embodiment of the present invention, oscillator 326 modulates coil 314 in the approximate range of 15-35 kHz. The inventors have found that the polarization of the optical signal has to vary by a rate that is in this range in order for the optical signal to see the same gain as the noise. However, it is considered to be apparent to one skilled in the relevant art to determine the frequency at which the optimum system performance is achieved.

Faraday rotators are typically contained within a stainless steel or other non-magnetic Casing. However, the high frequency excitation of coils 314 will result in RF heating of any metallic components used in Faraday rotator 302. Thus, the casing and supporting materials of Faraday rotator 302 are not substantially comprised of any metallic materials other than excitation coil 326. Rather, the preferred embodiment of Faraday rotator 302 has a easing 328 made of glass or composites. However, as one skilled in the relevant art would recognize, any type of materials may be used which allow the presentation of an alternating current (AC) field without unduly heating it.

Casing 328 is comprised of an opening for receiving lens 304. This enables the collimated optical beam 322 to pass through the Faraday rotator medium 316 after leaving lens 304. Likewise, casing 328 also has an opening for receiving lens 305 on the opposite side of Faraday rotator 302. Thus, optical beam 322 leaves input optical fiber 310, travels through lens 304, and enters Faraday rotator medium 320. As optical beam 322 travels along optical axis 306 in Faraday rotator 302, its polarization is modulated according to the induced time-varying magnetic field induced by oscillator 326, coils 314, and Faraday rotator medium 320. The optical signal 322 then exits Faraday rotator 302 through lens 305 and is imaged onto output optical fiber 312. As shown in FIG. 3, lens 304 and lens 305 are mounted in the single body casing 326. There is only air between the lenses 304, 305 and the Faraday rotator medium 320.

IV. Multiple Pass Modulators

Figure 4:
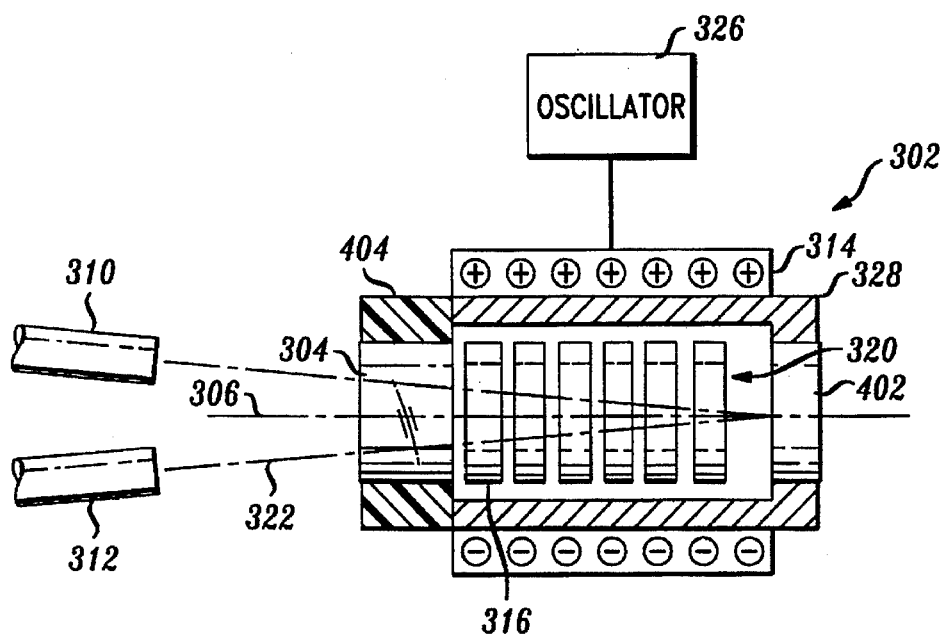
FIG. 4 is a modulator having an optical reflector to pass the light through the Faraday rotator of the present invention in both directions before being passed to an output fiber.

FIG. 4 illustrates the Faraday rotator 302 of the present invention implemented in a modulator 400 which enables optical signal 322 to make two passes through Faraday rotator 302 prior to entering output optical fiber 312. Referring now to FIG. 4, an optical reflector 402 is placed on one side of Faraday rotator 302. Input fiber 310 and output fiber 312 are placed adjacent to each other on the opposite side of Faraday rotator 302. The input fiber 310, optical reflector 402, and output optical fiber 312 are tilted relative to each other and relative to optical axis 306 so that optical signal 322 input from input fiber 310 passes through Faraday rotator 302 at an angle, impinges upon optical reflector 402, and returns to output optical fiber 312.

When optical signal 322 is reflected off of optical reflector 402, it enters Faraday rotator 302 in the opposite direction. Thus, optical signal 322 experiences a first rotation as it passes through Faraday rotator 302 from input optical fiber 310 to optical reflector 402. Optical signal 322 then experiences a second rotation as it passes through Faraday rotator 302 from the optical reflector 402 to output optical fiber 312. Since the Faraday rotator 302 is non-reciprocal, the second rotation experienced by the optical signal is cumulative with the first rotation. Thus, the optical signal which is imaged onto the output fiber 312 has double the polarization rotation at the optical fiber output as compared with modulator 300 of FIG. 3. It follows that for a specified amount of rotation, either half as much Faraday rotation material is required or the magnetic field required can be correspondingly less.

In the preferred embodiment of the present invention, optical reflector 420 is a multi-layer dielectric mirror or can be made of a reflecting metal such as gold. However, other types of flat mirrors may be used for a reflecting means 402.

Due to the use of optical reflector 402 on one side of the Faraday rotator 302 and both the input fiber 310 and the output fiber 312 on the same side of Faraday rotator 302, the arrangement of modulator 400 is referred to as a single-ended device.

In the arrangement illustrated in FIG. 4, modulator 400 utilizes a lensholder 404 to support lens 304 in casing 328. A lensholder may have also been used in modulator 300 to support lenses 304,305. An additional benefit to the arrangement of modulator 400 is that it enables the magnetic field to be applied to the Faraday rotator medium 320 along a region of optical axis 306 which is away from the lensholder assembly.

Figure 5:
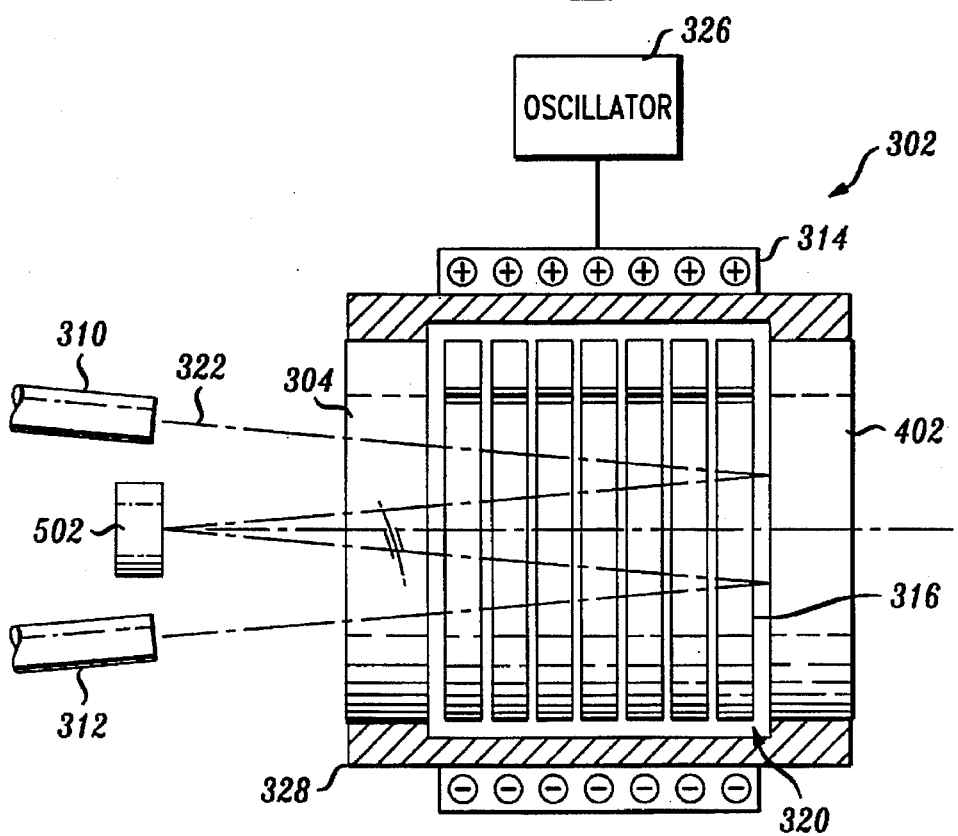
FIG. 5 is a modulator having an optical reflector on each side of the Faraday rotator of the present invention to achieve multiple passes through the Faraday rotator prior to being passed to the output fiber.

Another alterative embodiment is illustrated in FIG. 5. Referring now to FIG. 5, a modulator 500 achieves multiple passes through Faraday rotator 302 before imaging optical signal 322 on output fiber 312. Modulator 500 includes the use of a second optical reflector 502 on the same side of Faraday rotator 302 as the input and output fibers 310,312. Modulator 500 works in the same manner as modulator 400, except in modulator 500 the optical reflector 502 is positioned relative to optical reflector 402 so as to obtain the requisite number of reflections in order to achieve the desired amount of polarization rotation of the optical signal 322 propagating within Faraday rotator 302. In a typical example, the optical reflectors 402,502 are inclined so as to obtain two, four, or six passes through Faraday rotator 302 before exiting Faraday rotator 302 through lens 304 and entering output optical fiber 312.

The arrangement of modulator 500 results in the optical signal 322 making four passes through Faraday rotator 302. All other factors being the same, such as the length of Faraday rotator medium 320 and the applied magnetic field strength, optical signal 322 experiences four times the modulation or rotation in modulator 500 as compared to modulator 300.

As illustrated by the preferred and alternative embodiments above, any combination of parameters may be selected to achieve a desired polarization rotation. This includes choosing the number and type of garnet films which affect the wavelength range and degree of rotation for a given magnetic field strength; the number of coils, which affects the amount of magnetic field strength provided for a given sinusoidal input; the number of optical reflectors to achieve the desire number of reflections, etc.

While various embodiments of the present invention have been described above, it should be understood that they have been presented by way of example, and not limitation. Thus, the breadth and scope of the present invention should not be limited by any of the above-described exemplary embodiments, which should be defined only in accordance with the following claims and their equivalents.

What is claimed is:

1. An apparatus for modulating the polarization of an optical signal received from an input optical fiber, comprising:

Faraday rotator means for magnetically inducing a rotation of the polarization of the optical signal propagating along an optical axis passing through said Faraday rotator means, comprising,
    a Faraday rotator medium,
    a casing encompassing said Faraday rotator medium, and
    a magnetic coil surrounding said casing and said Faraday rotator medium;

oscillator means, electrically coupled to said magnetic coil, for producing a predetermined time-varying driving current in said magnetic coil, said predetermined time-varying driving current preventing gain depression of the optical signal; and collimator means for collimating the optical signal received from the input fiber and transmitted to an output fiber, wherein said driving current in said magnetic coil creates a time-varying magnetic field in said Faraday rotator medium to thereby modulate the polarization of the optical signal.

2. The apparatus of claim 1, wherein said casing comprises substantially non-conducting, non-magnetic material.

3. The modulator of claim 1, wherein said collimator means comprises:

a first lens disposed between the input fiber and said Faraday rotator medium; and
    a second lens disposed between said Faraday rotator medium and said output fiber.

4. The apparatus of claim 3, wherein said casing of said Faraday rotator means is adapted to receive said first lens on a first side and is further adapted to receive said second lens on a second side opposite said first side, said first side adjacent to the input fiber and said second side adjacent to said output fiber, wherein the optical signal propagates along said optical axis from the input fiber to said output fiber through said first lens, said Faraday rotator medium, and said second lens.

5. The apparatus of claim 1, further comprising:

a first optical reflector positioned adjacent to a second side of said casing opposite a first side, wherein the input fiber and said output fiber are placed adjacent to each other and adjacent to said first side of said casing; and wherein the input fiber, said first optical reflector, and said output fiber are positioned such that the optical signal travels from the input fiber to said first optical reflector through said Faraday rotator medium and from said optical reflector to said output fiber through said Faraday rotator medium.

6. The apparatus of claim 5, wherein said collimator means is disposed between the input and said output fibers and said Faraday rotator medium, and wherein said casing is adapted to receive said collimator means on a first side facing the input fiber and further adapted to receive said reflector means on a second side opposite said first side.

7. The apparatus of claim 6, further comprising:

a second optical reflector positioned adjacent to said first side of said casing, wherein the input fiber, said first optical reflector, said second optical reflector, and said output optical fiber are positioned such that the optical signal makes a plurality of passes through said Faraday rotator medium as it propagates from the input fiber to said output fiber.

8. The apparatus of claim 1, wherein said casing is comprised of glass.

9. The apparatus of claim 1, wherein said casing is comprised of a composite material.

10. The apparatus of claim 1, wherein said Faraday rotator medium is a Bismuth Iron Garnet.

11. The apparatus of claim 1, wherein said modulation uniformly utilizes all polarization states of the optical signal.

12. A telecommunications system for transmission of optical signals, comprising:

a first optical fiber;
    a second optical fiber;
    a source of an optical signal coupled to said first optical fiber, said source configured to operate at a predetermined wavelength;
    a plurality of optical amplifiers cascaded along said second optical fiber;
    Faraday rotator means, interposed between said first optical fiber and said second optical fiber, for modulating the polarization, based on the characteristics of the second optical fiber, of the optical signal prior to being amplified by said plurality of optical amplifiers, wherein said Faraday rotator means comprises,
        a Faraday rotator medium,
        a casing encompassing said Faraday rotator medium, wherein the first optical fiber and the second optical fiber are placed adjacent to each other and adjacent to a first side of the casing, and
        a magnetic coil surrounding said casing and said Faraday rotator medium;
    oscillator means electrically coupled to said magnetic coil, for producing a predetermined time-varying driving current in said magnetic coil, said predetermined time-varying driving current being based on the characteristics of the second optical fiber;
    collimator means for collimating the optical signal received from said first optical fiber prior to the optical signal entering said Faraday rotator means; and
    a first optical reflector positioned adjacent to a second side of said casing opposite said first side;
    wherein the first optical fiber, said first optical reflector, and said second optical fiber are positioned such that the optical signal travels from the first optical fiber to said first optical reflector through said Faraday rotator medium and from said first optical reflector to said second optical fiber through said Faraday rotator medium, wherein said driving current in said magnetic coil creates a time-varying magnetic field in said Faraday rotator medium thereby modulating the polarization of the optical signal.

13. The system of claim 12, wherein said collimator means is disposed between said first and second optical fibers and said Faraday rotator medium, and wherein said casing is adapted to receive said collimator means on said first side facing the input fiber and further adapted to receive said reflector means on said second side opposite said first side.

14. The system of claim 13, further comprising a second optical reflector positioned adjacent to said first side of said casing, wherein the first optical fiber, said first optical reflector, said second optical reflector, and said second optical fiber are positioned such that the optical signal makes a plurality of passes through said Faraday rotator medium as it propagates from the first optical fiber to said second optical fiber.

15. The modulator of claim 13, wherein said collimator means comprises:

a first lens disposed between the input fiber and said Faraday rotator medium; and a second lens disposed between said Faraday rotator medium and said output fiber.

16. The apparatus of claim 15, wherein said casing of said Faraday rotator means is adapted to receive said first lens on a first side and is further adapted to receive said second lens on a second side opposite said first side, said first side adjacent to the input fiber and said second side adjacent to said output fiber, wherein the optical signal propagates along said optical axis from the input fiber to said output fiber through said first lens, said Faraday rotator medium, and said second lens.

* * * * *